(12) United States Patent
Ivosevic

(10) Patent No.: US 11,527,125 B2
(45) Date of Patent: Dec. 13, 2022

(54) FOOD FRYING AND DISTRIBUTION DEVICE

(71) Applicant: Rajko Ivosevic, Turcin (HR)

(72) Inventor: Rajko Ivosevic, Turcin (HR)

( * ) Notice: Subject to any disclaimer, the term of this patent is extended or adjusted under 35 U.S.C. 154(b) by 785 days.

(21) Appl. No.: 16/546,295

(22) Filed: Aug. 20, 2019

(65) Prior Publication Data

US 2020/0058185 A1 Feb. 20, 2020

Related U.S. Application Data

(60) Provisional application No. 62/719,844, filed on Aug. 20, 2018.

(51) Int. Cl.
| | | |
|---|---|---|
| *G07F 17/00* | (2006.01) | |
| *A47J 37/12* | (2006.01) | |
| *G07F 9/10* | (2006.01) | |

(52) U.S. Cl.
CPC ...... *G07F 17/0085* (2013.01); *A47J 37/1214* (2013.01); *A47J 37/1219* (2013.01); *A47J 37/1228* (2013.01); *A47J 37/1295* (2013.01); *G07F 9/105* (2013.01)

(58) Field of Classification Search
CPC ............. A47J 37/1214; A47J 37/1219; A47J 37/1228; A47J 37/1295; G07F 17/0085
See application file for complete search history.

(56) References Cited

U.S. PATENT DOCUMENTS

| | | |
|---|---|---|
| 3,667,373 A | 6/1972 | Sicher |
| 3,685,432 A | 8/1972 | Hoeberigs |
| 4,586,429 A * | 5/1986 | Hawkins ............. A47J 37/1228 99/407 |
| 4,722,267 A | 2/1988 | Galockin et al. |
| 4,838,455 A | 6/1989 | Hoeberigs |
| 5,224,415 A * | 7/1993 | McFadden .......... A47J 37/1228 222/146.6 |
| 5,404,797 A | 4/1995 | Millar |
| 2017/0095118 A1* | 4/2017 | Loss ................... A47J 37/1271 |
| 2018/0160853 A1* | 6/2018 | Miyoshi ............. A47J 37/1219 |

FOREIGN PATENT DOCUMENTS

| | | | | |
|---|---|---|---|---|
| EP | 0277920 A1 * | 8/1988 | .......... | F24C 15/2042 |
| EP | 0380816 A1 * | 8/1990 | .......... | A47J 37/1228 |
| EP | 0406475 A1 * | 1/1991 | ......... | G07F 17/0085 |

* cited by examiner

*Primary Examiner* — John J Norton

(57) ABSTRACT

A food frying and distribution device is used to pre-cook frozen food for storage and subsequent dispensing. The apparatus is configured to fry food to near completion, to store that food, and to then finish cooking upon consumer request, thereby reducing cooking time. The apparatus includes a housing, a frozen-foods inlet, a fried-foods outlet, at least one fryer basin, a first frying basket, a second frying basket, a first conveyor, a second conveyor, a vending mechanism, and a control unit. The housing is the protective shell that allows for arrangement of components. The frozen-foods inlet is an opening through which a user may insert frozen foods for preparation and storage within the apparatus. Conversely, the fried-foods outlet is an opening through which fried foods may be obtained by a consumer. The general configuration of the aforementioned components allows the apparatus to efficiently and effectively generate fried food relatively quickly.

17 Claims, 14 Drawing Sheets

FOOD FRYING AND DISTRIBUTION DEVICE

The current application claims a priority to the U.S. Provisional Patent application Ser. No. 62/719,844 filed on Aug. 20, 2018.

FIELD OF THE INVENTION

The present invention generally relates to food preparation. More specifically, the food frying and distribution device relates to a two-stage food fryer combined with a dispensing tool.

BACKGROUND OF THE INVENTION

Social trends have advanced the food preparation and service industry away from independent food preparation and towards convenience and speed. The homecooked meal is being methodically replaced with options that result in increased time and energy efficiency, resulting generally in less time spent eating and more time spent otherwise. Among the methods developed for providing cheap food to consumers is the vending machine. Such devices often provide a wide variety of foods, particularly pre-packaged or ready-to-eat products including snack foods and frozen desserts. These machines are restocked regularly to provide variety and availability to the user. Some vending machines can even provide fresh-cooked food that is not cold or pre-packaged. Among the more popular of these devices is a food-frying vending machine. This vending machine type typically douses the food in hot oil while the food is frozen and subsequently dispense the resultant food product to the consumer.

However, these food-frying vending machines can take a long time to deliver the final food product to the user. It takes time to raise the frying oil from its idle state to the appropriate state needed to properly and thoroughly cook the foods. Further, once the oil is ready, more time is required for the food to be adequately and safely cooked within the hot oil. In addition, once cooked, more time must pass for the foods to be cooled down enough for the user to handle and eat. The excessive required time contradicts current culinary trends towards speed and efficiency. What is needed is a device that can shorten the amount of time a consumer must wait before receiving food. Further desirable is a device that can provide that cooked food efficiently and effectively to the consumer.

The present invention addresses these issues. The present invention intends to provide users with a device that can cook frozen food in oil at least partially and store that food prior to being selected and/or purchased by a user. The present invention can then immediately re-fry the pre-fried food stored within the device once the user has purchased a food item. A series of conveyors are used to lift the frying baskets into and out of the hot cooking oil. A set of trapdoors and chutes is utilized to store pre-cooked items until a consumer interacts with the present invention. The food items are then separated and dispensed in appropriate quantities into the second fryer. After pre-fried food is reheated, the food is lifted and dispensed to the consumer, after a comparatively short amount of time.

DETAILED DESCRIPTION OF THE INVENTION

All illustrations of the drawings are for the purpose of describing selected versions of the present invention and are not intended to limit the scope of the present invention.

Figure 1:
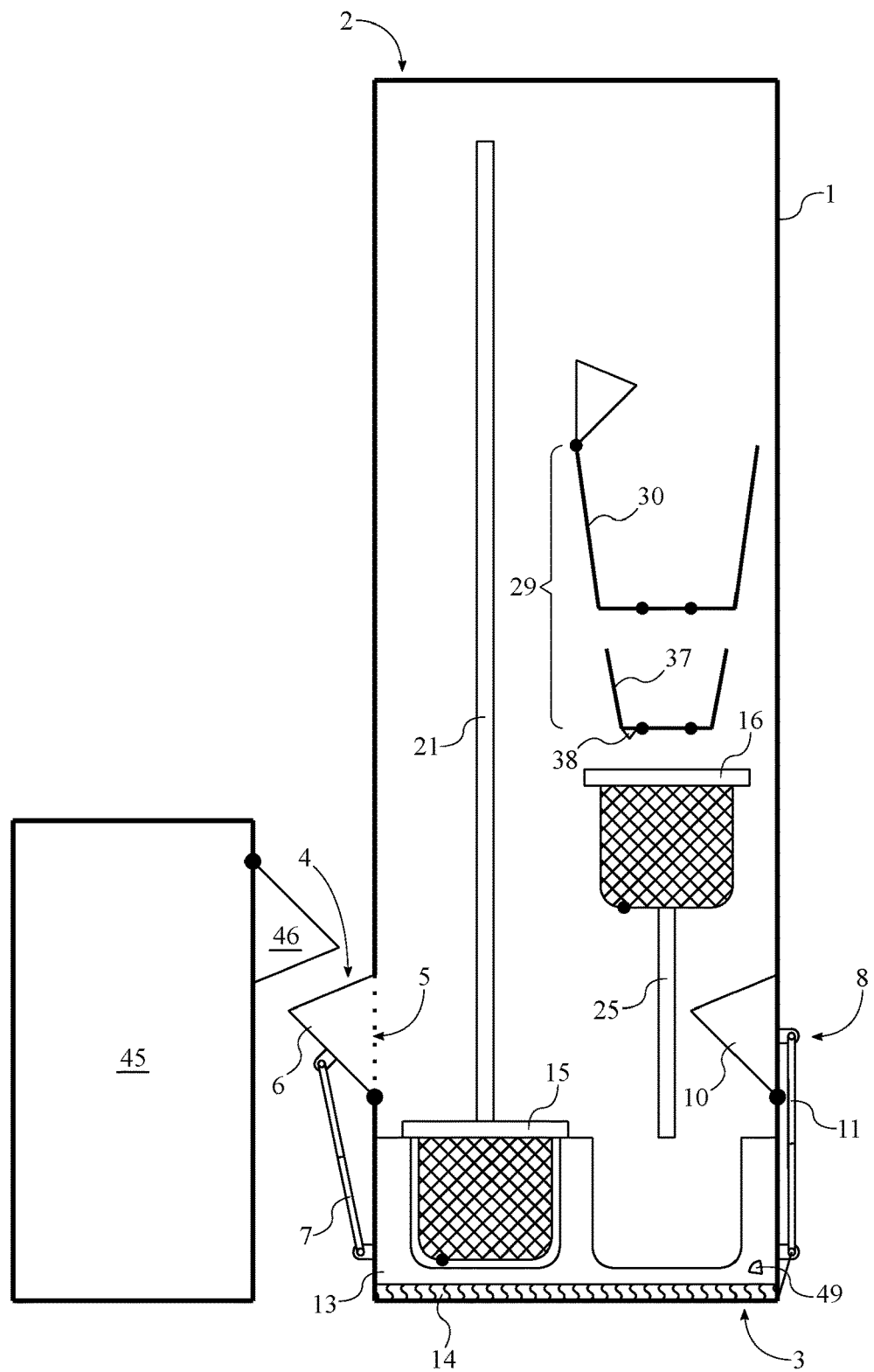
FIG. 1 is a schematic diagram of the present invention representing frozen food input and pre-cooking.
Figure 9:
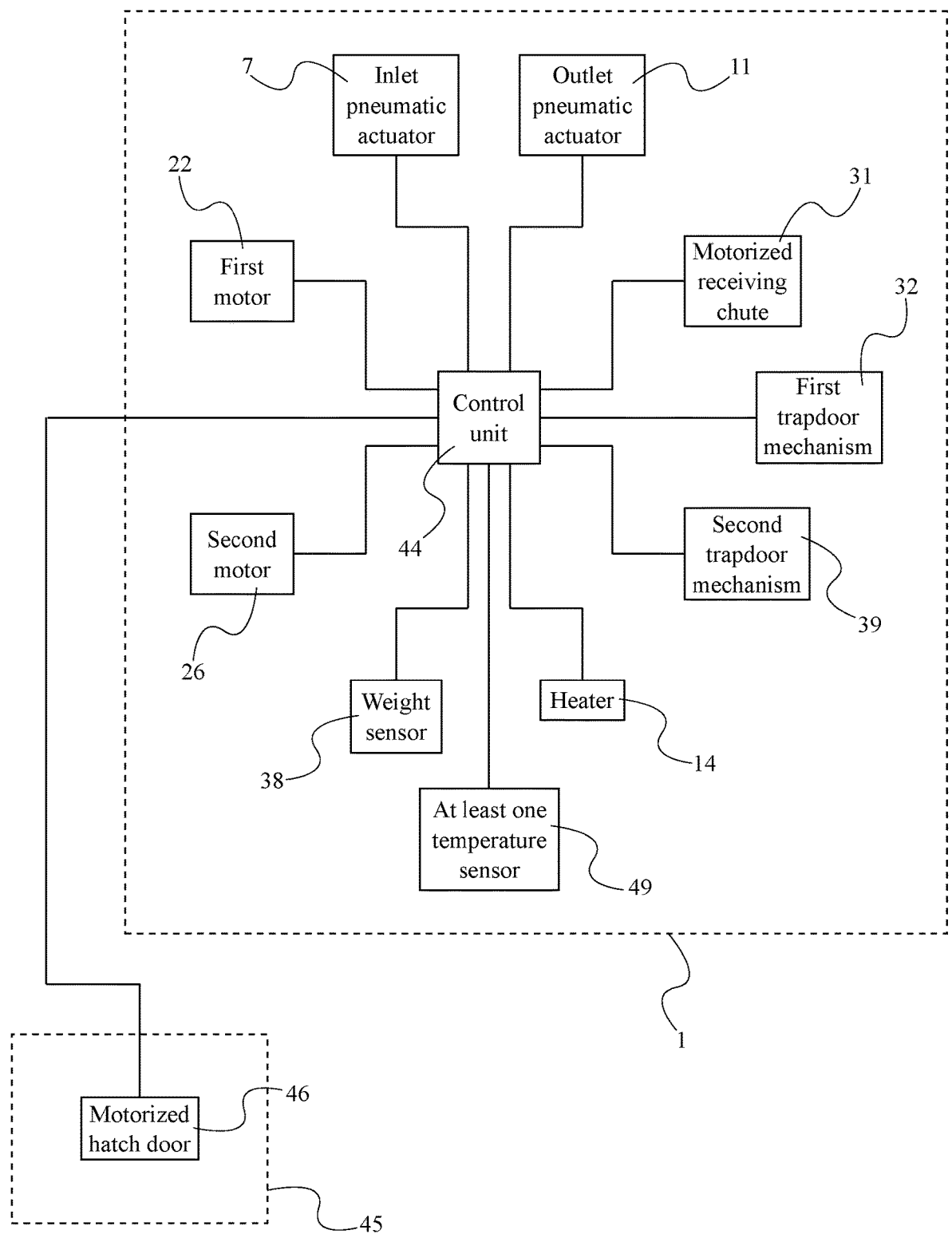
FIG. 9 is a process flow diagram representing the electronic connections of the present invention.
Figure 11:
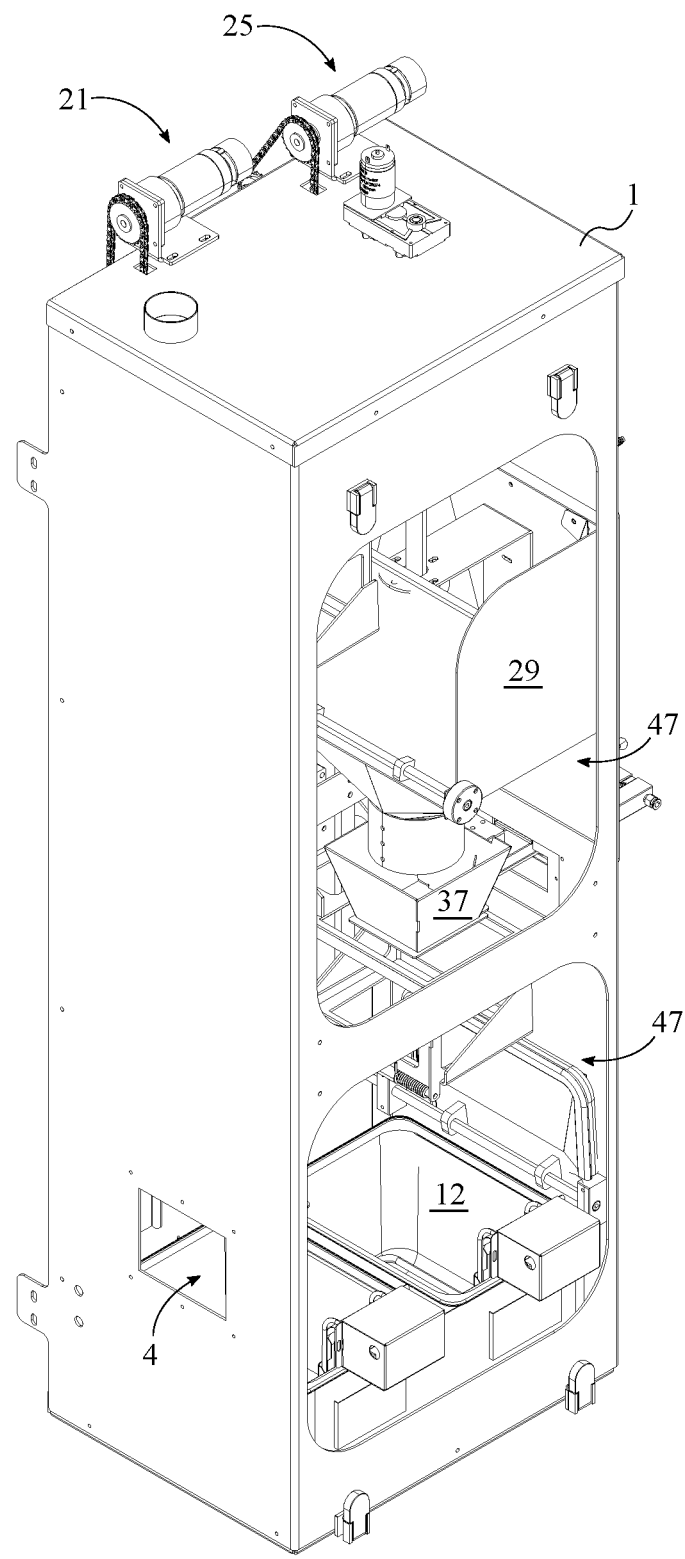
FIG. 11 is a top-front perspective view of the present invention without the hatch doors.
Figure 12:
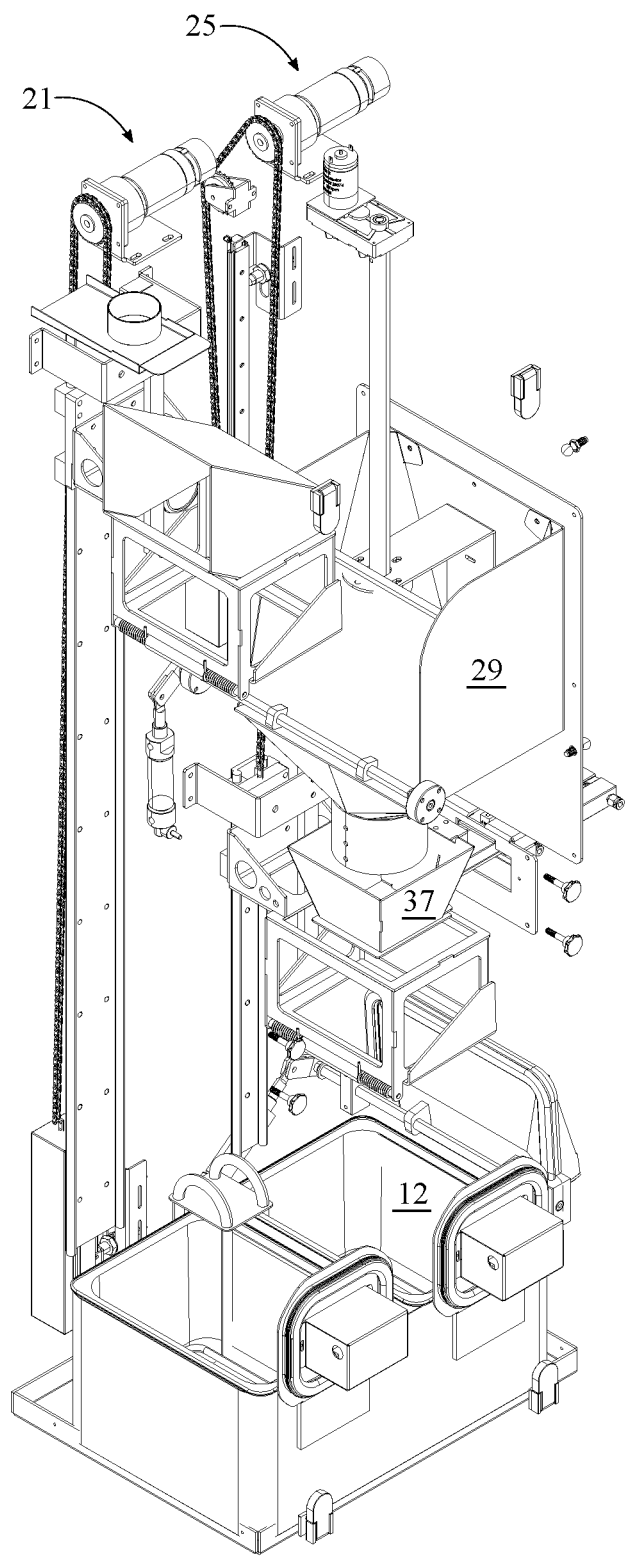
FIG. 12 is a top-front perspective view of the present invention without the housing.

The present invention is a food frying and distribution device that is used to pre-cook frozen food for storage and subsequent dispensing. The present invention is configured to fry food to near completion, store that food, and then finish cooking upon consumer request, thereby reducing cooking time. The present invention comprises a housing 1, a frozen-foods inlet 4, a fried-foods outlet 8, at least one fryer basin 12, a first frying basket 15, a second frying basket 16, a first conveyor 21, a second conveyor 25, a vending mechanism 29, and a control unit 44, as seen in FIGS. 1, 11, and 12. The housing 1 is the protective shell that allows for arrangement of components. The frozen-foods inlet 4 is an opening through which a user may insert frozen foods for preparation and storage within the present invention. Conversely, the fried-foods outlet 8 is an opening through which fried foods may be obtained by a consumer. The at least one fryer basin 12 relates to a thermally insulated container which, in the preferred usage of the present invention, contains cooking oil. In an exemplary embodiment, the at least one fryer basin 12 includes two fryer basins. The first frying basket 15 relates to a mesh bin similar to conventional frying racks in shape, size, and heat resistance. Similarly, the second frying basket 16 relates to a mesh bin similar to conventional frying racks in shape, size, and heat resistance. The first conveyor 21 is a series of interconnected components that combine to allow for adjustment of the vertical position of the first frying basket 15 within the housing 1. Similarly, the second conveyor 25 is a series of interconnected components that combine to allow for adjustment of the vertical position of the second frying basket 16 within the housing 1. The vending mechanism 29 relates to a container adapted to hold and distribute appropriate amounts of food into the second frying basket 16. The control unit 44, as represented in FIG. 9, relates to the system of controllers, wires, power supplies, resistors, and other common electrical components necessary to provide adequate power to necessary components and to allow the user to interact with the present invention.

Figure 2:
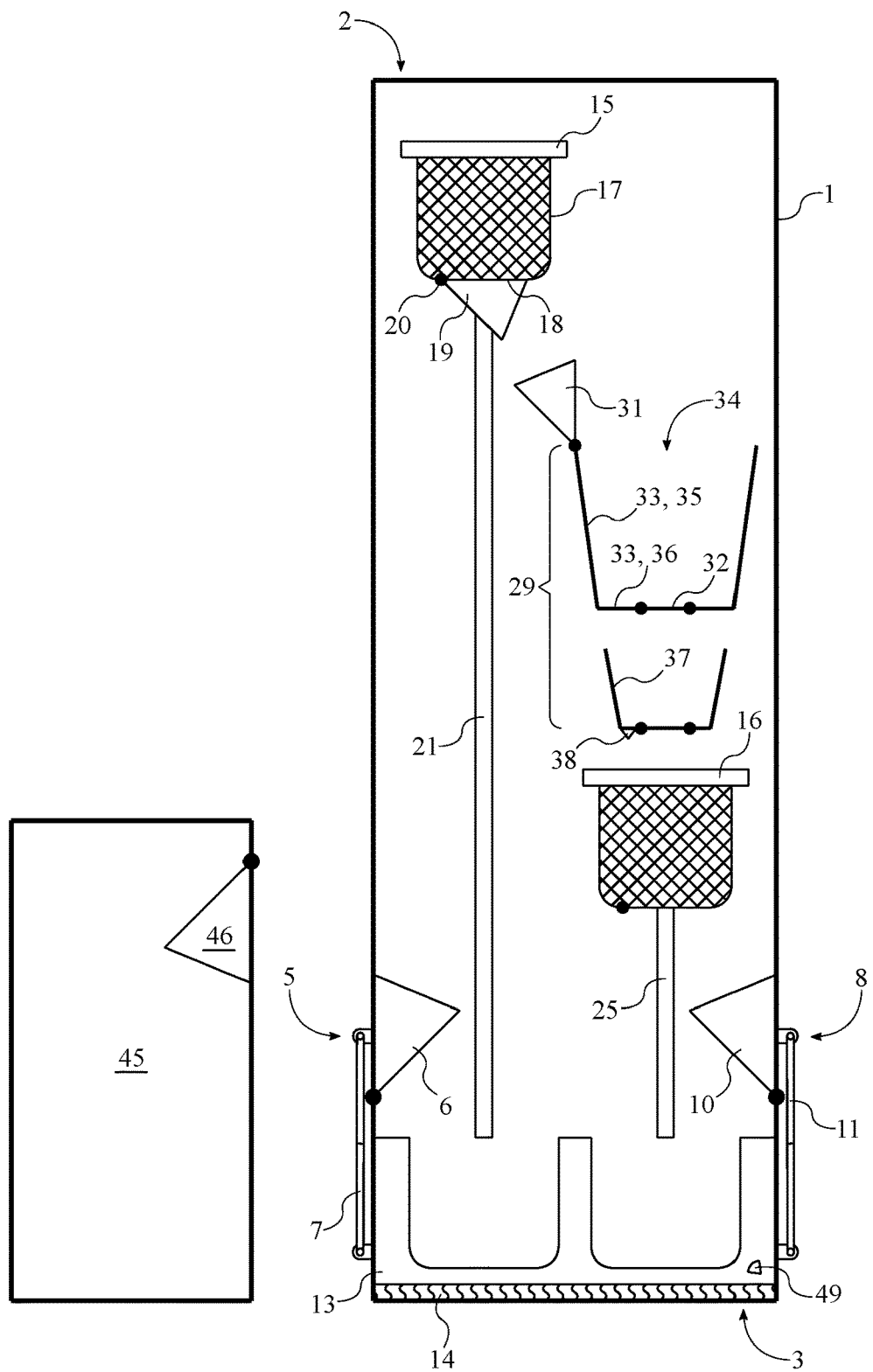
FIG. 2 is a schematic diagram of the present invention representing lifting of pre-cooked food and transfer to internal long-term storage.

The general configuration of the aforementioned components allows the present invention to efficiently and effectively fry food stuffs in a segmented manner in order to have the final version of the food stuffs readily available to the consumer. The housing 1 comprises a roof 2 and a floor 3, as seen in FIG. 2. The roof 2 relates to the upper end of the housing 1, while the floor 3 relates to the lower end of the housing 1. The roof 2 and the floor 3 are positioned opposite to each other about the housing 1. Thus, the roof 2 and the floor 3 define the space enclosed by the housing 1. The at least one fryer basin 12, the first frying basket 15, the second frying basket 16, the first conveyer 21, the second conveyer 25, and the vending mechanism 29 are each positioned within the housing 1. This arrangement ensures that the at least one fryer basin 12, the first frying basket 15, the second frying basket 16, the first conveyer 21, the second conveyer 25, and the vending mechanism 29 are each protected by the housing 1. The at least one fryer basin 12 is mounted onto the floor 3. In this way, the at least one fryer basin 12 is optimally positioned to receive the first frying basket 15 and the second frying basket 16 during use. The first conveyer 21 traverses from the at least one fryer basin 12 to the roof 2. Thus, the first conveyer 21 allows connected objects to elevate through the height of the housing 1. The first frying basket 15 is operatively coupled to the first conveyer 21, wherein the first conveyer 21 is used to move the first frying basket 15 through the housing 1. Therefore, the first conveyer 21 allows the first frying basket 15 to enter and exit the at least one fryer basin 12, and to elevate near to the roof 2. The vending mechanism 29 is mounted in between the roof 2 and the at least one fryer basin 12. This arrangement allows the contents of the vending mechanism 29 to tend to approach the at least one fryer basin 12 through the effects of gravity. The second conveyer 25 traverses from the vending mechanism 29 to the at least one fryer basin 12. Thus, the second conveyer 25 allows attached components to shift position between the at least one fryer basin 12 and the vending mechanism 29. The second frying basket 16 is operatively coupled to the second conveyer 25, wherein the second conveyer 25 is used to move the second frying basket 16 through the housing 1. Therefore, the second frying basket 16 is able to dip into and out of the at least one fryer basin 12. The frozen-foods inlet 4 is integrated into the housing 1, adjacent to the first conveyer 21. This arrangement allows the user to easily add frozen foods into the housing 1 and then into first frying basket 15. The fried-foods outlet 8 is integrated into the housing 1, adjacent to the second conveyer 25. Thus, the user may conveniently access prepared fried foods upon completion of the food preparation from the second frying basket 16. The at least one fryer basin 12, the first conveyer 21, the second conveyer 25, and the vending mechanism 29 are each electronically connected to the control unit 44. Therefore, the control unit 44 can coordinate signals between the at least one fryer basin 12, the first conveyer 21, the second conveyer 25, and the vending mechanism 29, thus allowing for moving components to interact appropriately.

Figure 3:
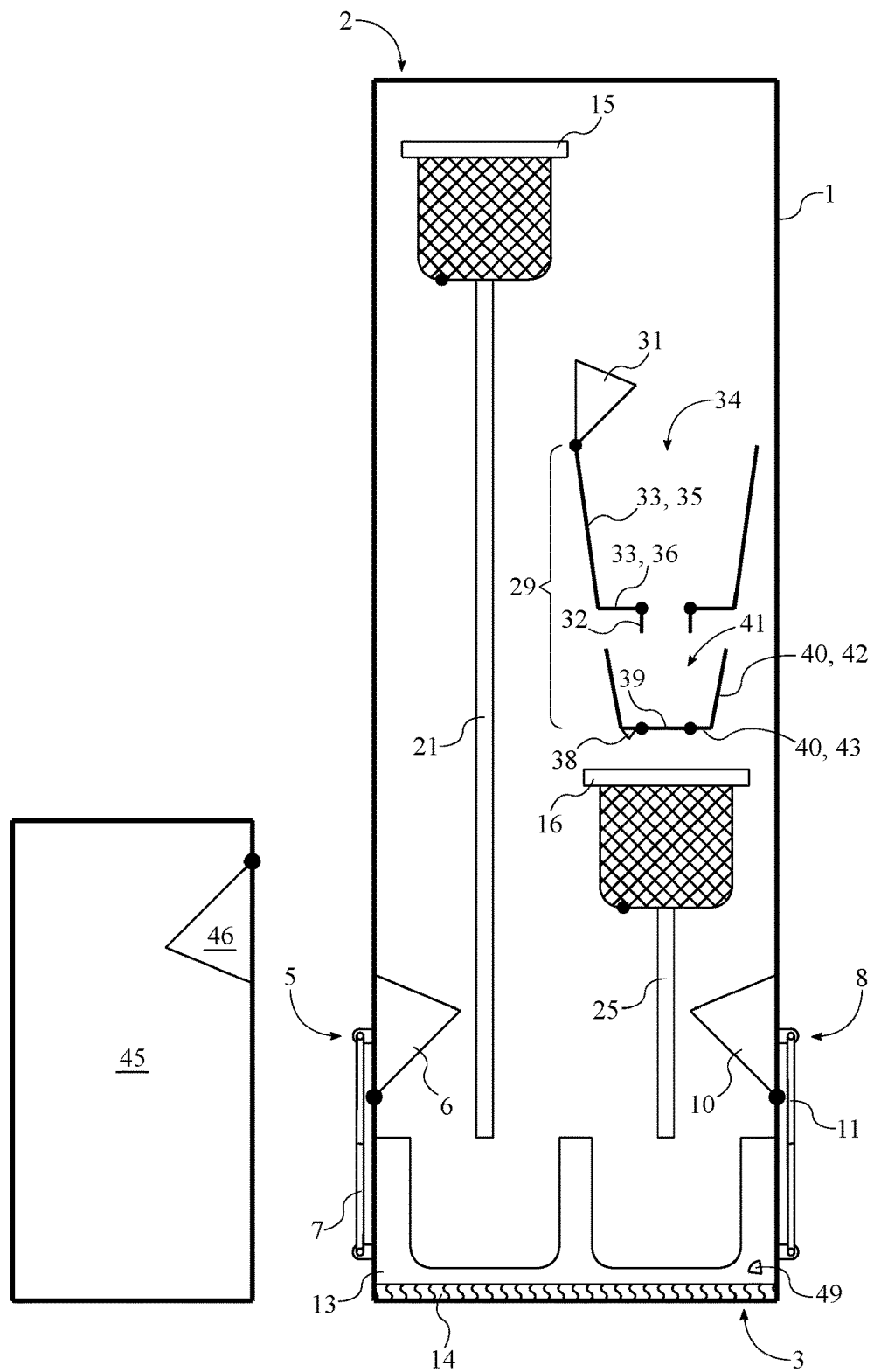
FIG. 3 is a schematic diagram of the present invention representing transfer of pre-cooked food to internal short-term storage.

The at least one basin body 13 requires a mechanism for raising the temperature of the contents. To this end, the at least one fryer basin 12 comprises a basin body 13 and a heater 14, as seen in FIG. 3. The basin body 13 represents the physical space occupied by the at least one fryer basin 12. The heater 14 is any of a variety of electrically powered temperature regulating devices capable of withstanding thermal fatigue. The heater 14 is in thermal communication with the basin body 13. This relationship allows the heater 14 to effectively raise the temperature of the basin body 13, and consequently, the temperature of the contents therein. The heater 14 is electronically connected to the control unit 44. Thus, the control unit 44 can modulate the temperature of the basin body 13.

Figure 4:
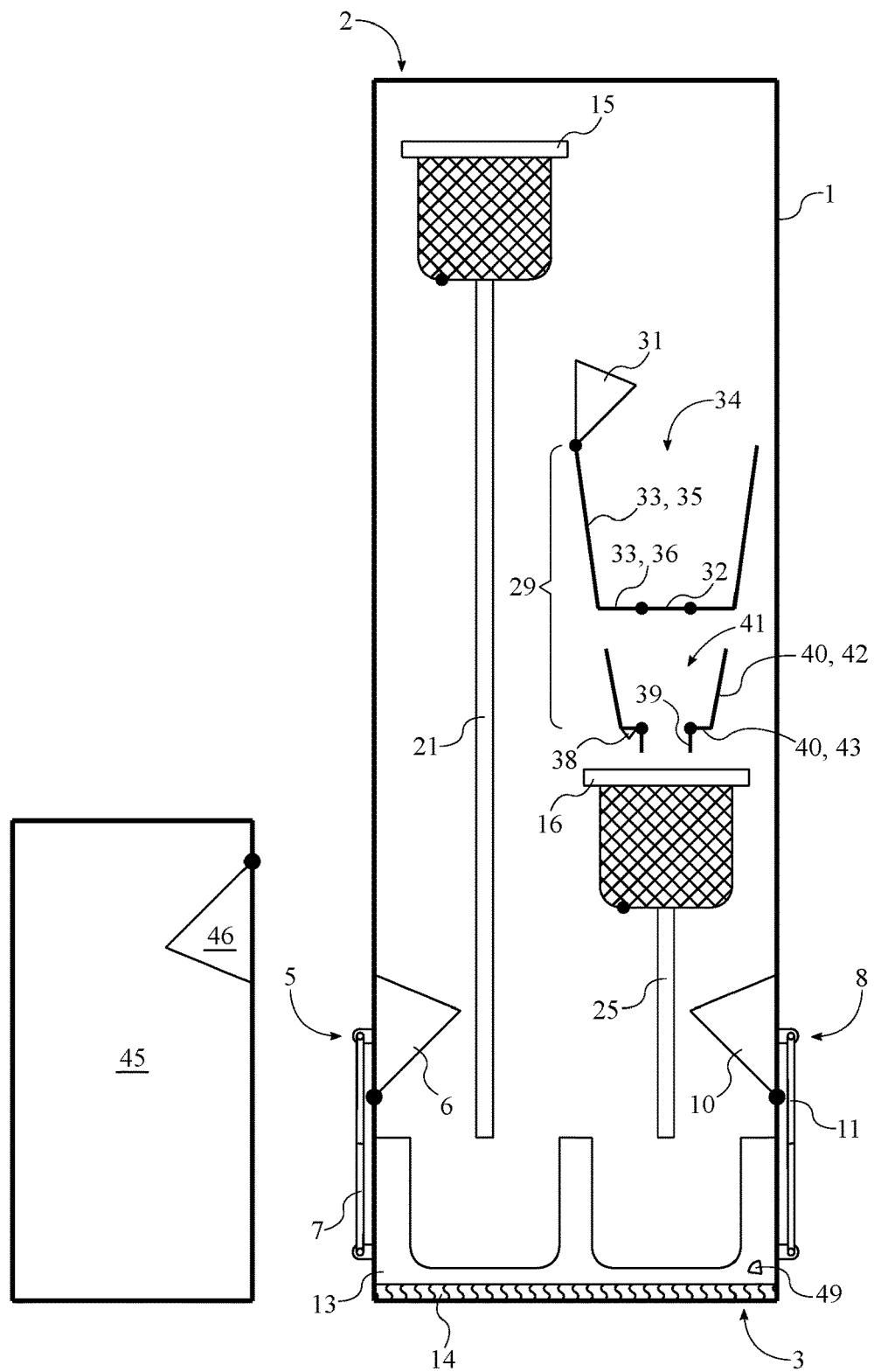
FIG. 4 is a schematic diagram of the present invention representing transfer of pre-cooked food to the frying basket.

In the preferred version of the present invention, the at least one fryer basin 12 is divided into sections corresponding to the first frying basket 15 and the second frying basket 16. To this end, the at least one fryer basin 12 may be a first fryer basin and a second fryer basin, as seen in FIG. 4. The first fryer basin and the second fryer basin are positioned adjacent to each other. This arrangement provides advantages in assembly, installation, and maintenance convenience, as well as potentially enhancing the effectiveness of the heater 14. The first fryer basin is positioned adjacent to the first conveyer 21. Thus, the first fryer basin is appropriately positioned for engagement by the first frying basket 15. Similarly, the second fryer basin is positioned adjacent to the second conveyer 25. Thus, the second fryer basin is appropriately positioned for engagement by the second frying basket 16.

While versions of the present invention exist that require regular supplementation of frozen foods, the effectiveness of the present invention improves by including more long-term food storage than that provided by the vending mechanism 29. To achieve this goal, the present invention further comprises a freezer 45, as seen in FIG. 1. The freezer 45 is a contained volume in which low temperatures are maintained. The freezer 45 is externally positioned to the housing 1. This arrangement results in easy access to the freezer 45, thereby facilitating regular upkeep of the food supply for the present invention. The freezer 45 is mounted adjacent to the frozen-foods inlet 4. Thus, the freezer 45 provides the present invention with convenient access for supplying frozen foods into the housing 1 and the components therein.

The freezer 45 benefits from the addition of enhanced control over the quantity of food being dispensed through the frozen-foods inlet 4. Therefore, the freezer 45 comprises a motorized hatch door 46, as seen in FIG. 1. The motorized hatch door 46 is a powered adjustable opening that allows for frozen food to exit the freezer 45. The motorized hatch door 46 is positioned adjacent to the frozen-foods inlet 4. This arrangement ensures that frozen food that exits through the motorized hatch door 46 passes through the frozen-foods inlet 4 and into the housing 1. The motorized hatch door 46 is electronically connected to the control unit 44. Thus, the control unit 44 regulates the flow of frozen foods out of the freezer 45 and through the frozen-foods inlet 4, potentially in response to timers or sensor signals.

In order to both retain pre-cooked foods and dispense these foods in accurate quantities, the vending mechanism 29 must be equipped with components that allow for flow regulation. To this end, the vending mechanism 29 comprises a retaining assembly 30 and a weight assembly 37, as seen in FIG. 2. The retaining assembly 30 relates to a volume of space adapted to store foods that have been pre-cooked. The weight assembly 37 relates to the systems in place for determining an appropriate amount of pre-cooked food to provide for reheating upon consumer request. The weight assembly 37 is positioned in between the retaining assembly 30 and the second conveyer 25. Therefore, the weight assembly 37 can dispense onto the second frying basket 16 attached to the second conveyer 25.

The retaining assembly 30 relates to a series of features that enable reception, storage, and transferal of pre-cooked foods from the first frying basket 15 to the weight assembly 37. To achieve this, the retaining assembly 30 comprises a motorized receiving chute 31, a first trapdoor mechanism 32, and a first receptacle 33, as seen in FIG. 3. The motorized receiving chute 31 relates to a hinged tray that extends beneath the first frying basket 15 to enable reception of the contents thereof. The first trapdoor mechanism 32 is an opening and a set of components that operate in conjunction to enable controlled release of contained pre-cooked foods. The first receptacle 33 is an open volume in which pre-cooked foods are stored. Moreover, the first receptacle 33 comprises a first receptacle inlet 34, a first receptacle body 35, and a first receptacle base 36. The first receptacle inlet 34 denotes the primary opening of the first receptacle 33, through which pre-cooked foods may enter the first receptacle 33. The first receptacle body 35 represents the physical space occupied by the first receptacle 33 within the housing 1. The first receptacle base 36 denotes the lower portion of the first receptacle 33. The first receptacle inlet 34 is oriented towards the roof 2. Therefore, the first receptacle inlet 34 is positioned to allow the first receptacle 33 to retain the contents of the first receptacle 33. The first receptacle base 36 is oriented towards the weight assembly 37. In this way, the first receptacle base 36 is optimally positioned to transfer contents into the weight assembly 37. The motorized receiving chute 31 is hingedly connected to the first receptacle body 35, adjacent to the first receptacle inlet 34. This arrangement allows the motorized receiving chute 31 to deploy and allow access to the first receptacle inlet 34. The first trapdoor mechanism 32 is operatively integrated into the first receptacle base 36, wherein the first trapdoor mechanism 32 is used to selectively create an opening in the first receptacle base 36. Such an arrangement ensures that the first receptacle 33 dispenses precisely the correct volume of pre-cooked food onto the weight assembly 37. The motorized receiving chute 31 and the first trapdoor mechanism 32 are electronically connected to the control unit 44. Therefore, the control unit 44 provides the operative signals to the motorized receiving chute 31 and the first trapdoor mechanism 32, possibly in response to signals generated from processing of various timers or sensors.

Pre-cooked foods may have different surface properties, resulting in unpredictable motion or resistance to motion through the retaining assembly 30. To reduce this variance, the first receptacle body 35 tapers from the first receptacle inlet 34 to the first receptacle base 36, as seen in FIG. 4. The taper of the first receptacle body 35 results in the generation of smaller normal forces on each item within the first receptacle body 35, thereby improving the flow of various foods through the retaining assembly 30.

The weight assembly 37 requires components capable of measuring and dispensing pre-cooked food through the housing 1. To this end, the weight assembly 37 comprises a weight sensor 38, a second trapdoor mechanism 39, and a second receptacle 40, as seen in FIG. 4. The weight sensor 38 is a pressure detection device capable of sending electronic signals in response to changes in the pressure applied. The second trapdoor mechanism 39 is an opening and a set of components that operate in conjunction to enable controlled release of contained pre-cooked foods. The second receptacle 40 is an open volume in which pre-cooked foods are stored. Furthermore, the second receptacle 40 comprises a second receptacle inlet 41, a second receptacle body 42, and a second receptacle base 43. The second receptacle inlet 41 denotes the primary opening of the second receptacle 40, through which pre-cooked foods may enter the second receptacle 40. The second receptacle body 42 represents the physical space occupied by the second receptacle 40 within the housing 1. The second receptacle base 43 denotes the lower portion of the second receptacle 40. The second receptacle inlet 41 is oriented towards the retaining assembly 30. Therefore, the second receptacle inlet 41 is optimally positioned to transfer contents into the weight assembly 37. The second receptacle base 43 is oriented towards the floor 3. In this way, the second receptacle base 43 is positioned to allow the second receptacle 40 to dispense the contents of the second receptacle body 42 through gravitational forces. The weight sensor 38 is operatively integrated into the second receptacle base 43, wherein the weight sensor 38 is used to take a weight measurement of contents within the second receptacle 40. Thus, the weight sensor 38 is capable of providing the data required to determine the quantity of food contained within the second receptacle 40. The second trapdoor mechanism 39 is operatively integrated into the second receptacle base 43, wherein the second trapdoor mechanism 39 is used to selectively create an opening in the second receptacle base 43. Such an arrangement ensures that the second receptacle 40 dispenses the correct volume of pre-cooked food to the second frying basket 16. The weight sensor 38 and the second trapdoor mechanism 39 are electronically connected to the control unit 44. Therefore, the control unit 44 provides the operative signals to the second trapdoor mechanism 39 in response to signals received from the weight sensor 38, and possibly in response to signals generated from processing of various timers or other sensors.

Figure 5:
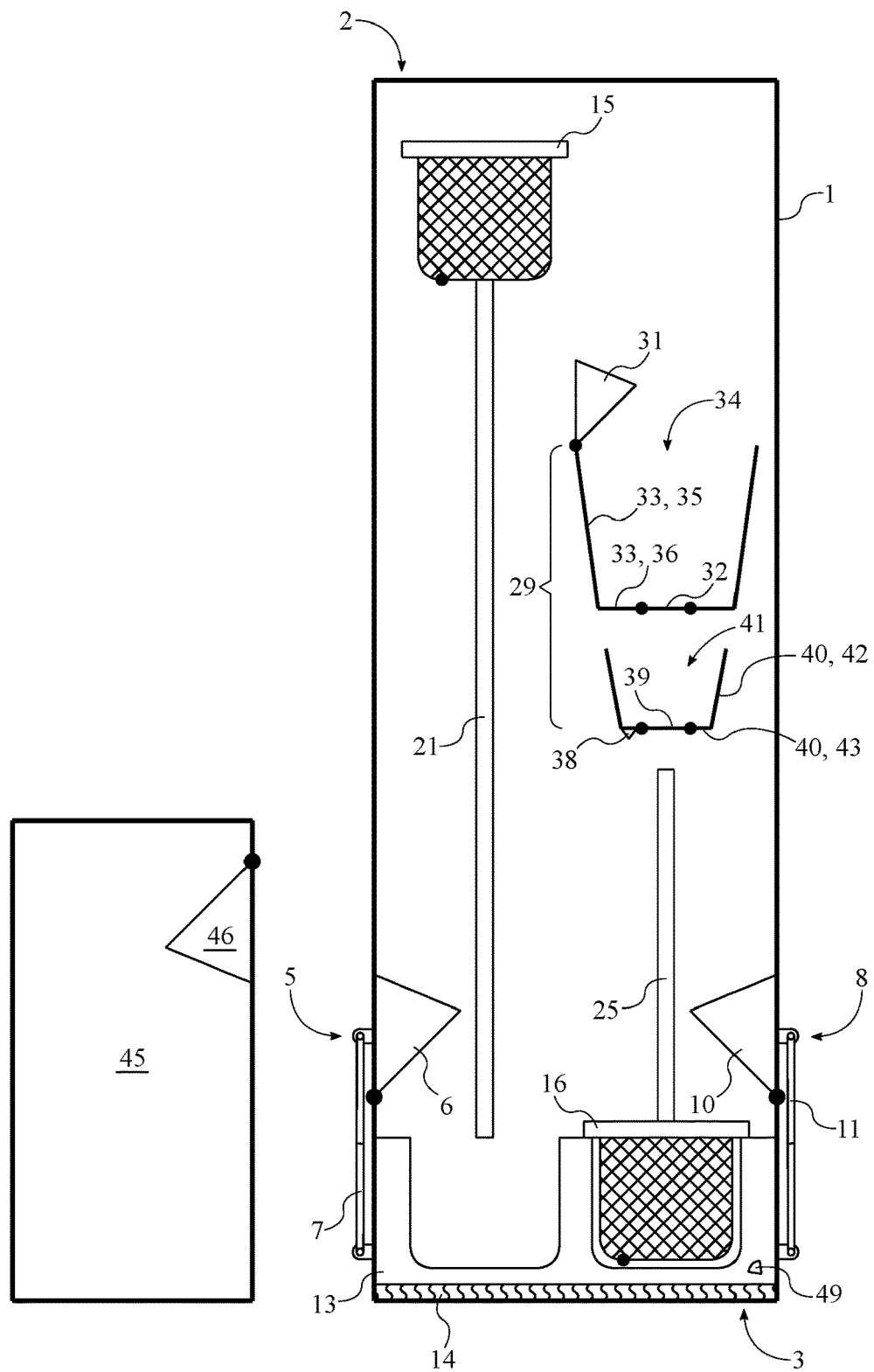
FIG. 5 is a schematic diagram of the present invention representing immersion of pre-cooked food in oil.

Similar to the retaining assembly 30, pre-cooked foods within the weight assembly 37 may have different surface properties, resulting in unpredictable motion or resistance to motion through the weight assembly 37. To reduce this variance, the second receptacle body 42 tapers from the first receptacle inlet 34 to the first receptacle base 36, as seen in FIG. 5. The taper of the second receptacle body 42 results in the generation of smaller normal forces on each item within he second receptacle body 42, thereby improving the flow of various foods through the weight assembly 37.

Figure 6:
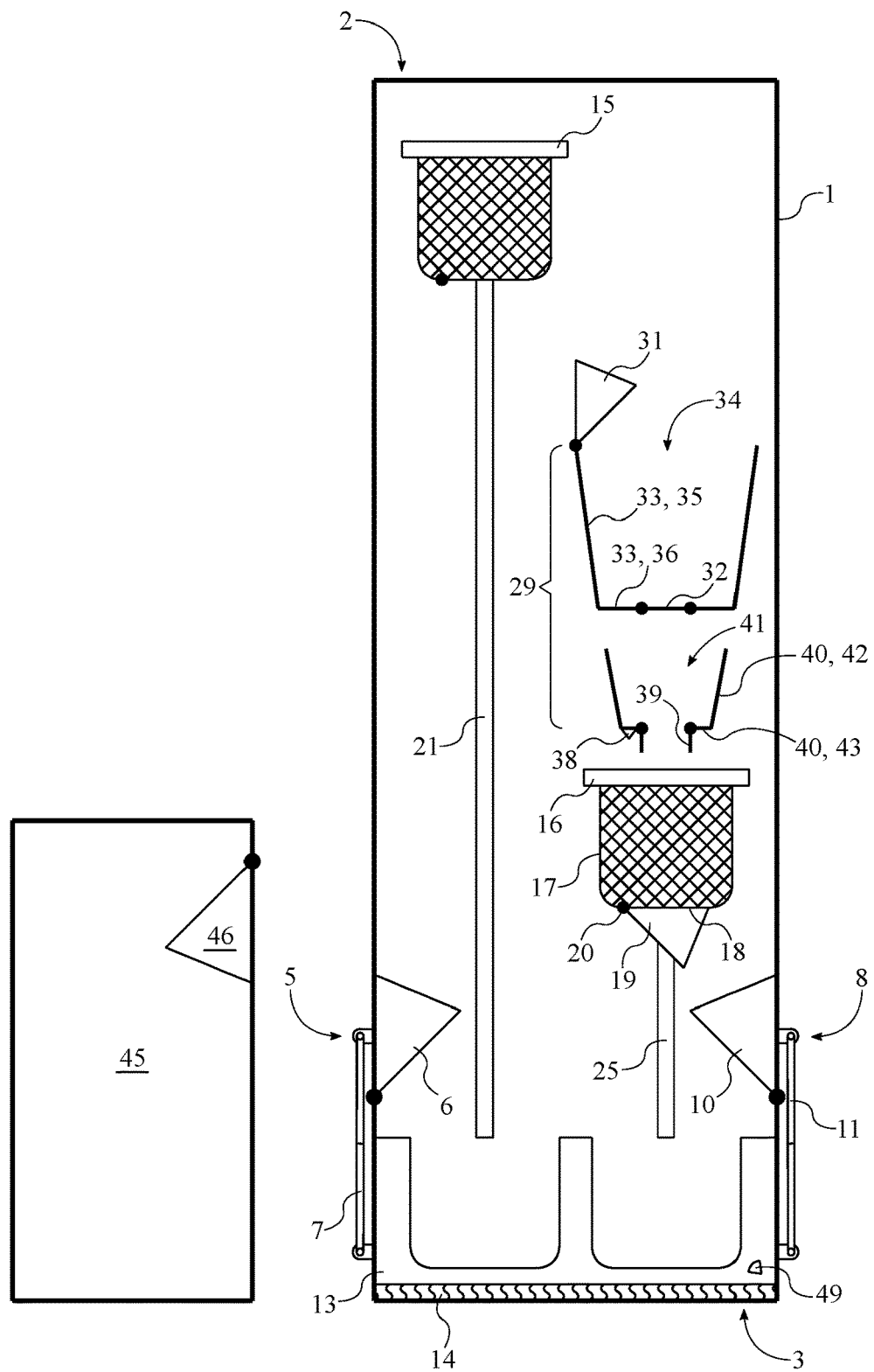
FIG. 6 is a schematic diagram of the present invention representing pre-dispensing of cooked foods.

The first frying basket 15 and the second frying basket 16 must both be capable of receiving food, containing food during the frying process, and dispensing food throughout the various components of the present invention. To provide this capability, the first frying basket 15 and the second frying basket 16 each comprise a lateral basket wall 17, a basket base 18, a transfer chute 19, and a spring-loaded release mechanism 20, as seen in FIG. 6. The lateral basket wall 17 is a perforated or mesh surface representing the lateral limits of the volume of operative space within the first frying basket 15 and the second frying basket 16. The basket base 18 represents the bottom surface of the first frying basket 15 and the second frying basket 16 that allows for food retention during cooking and motion through the housing 1 in accordance with the first conveyer 21 and the second conveyer 25. The transfer chute 19 is the opening that enables release of contained foods at the appropriate time upon completion of cooking. The spring-loaded release mechanism 20 represents the system of components that enable operation of the transfer chute 19. The lateral basket wall 17 is perimetrically connected to the basket base 18. This arrangement defines the volume of useful space for food retention within the first frying basket 15 and the second frying basket 16. The basket base 18 is oriented towards the floor 3. In this way, the effects of gravity ensure retention of food during cooking and operative motion. The transfer chute 19 is operatively integrated into the basket base 18 by the spring-loaded release mechanism 20, wherein the spring-loaded release mechanism 20 is used to release contents within the first frying basket 15 or the second frying basket 16 by selectively opening the transfer chute 19. Thus, the spring-loaded release mechanism 20 determines the open or closed state of the transfer chute 19. In an exemplary embodiment, the spring-loaded release mechanism 20 operates in conjunction with a protrusion extending internally from the housing 1. The spring-loaded release mechanism 20 opens when the first conveyer 21 or the second conveyer 25 lifts the spring-loaded release mechanism 20 into contact with the internal protrusion, thus providing the necessary resistance to open the transfer chute 19 against the spring bias provided by the spring-loaded release mechanism 20.

Figure 7:
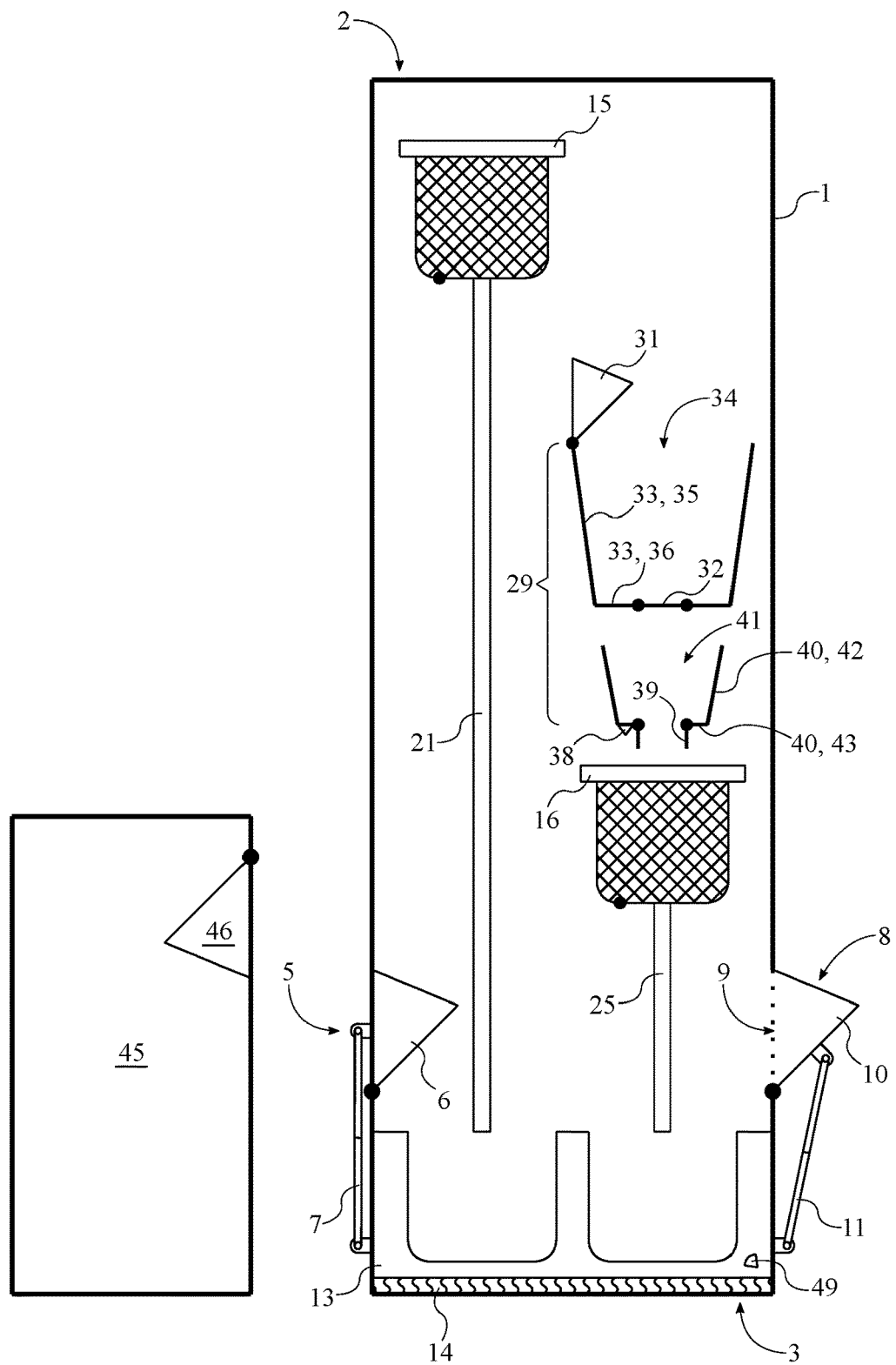
FIG. 7 is a schematic diagram of the present invention representing dispensing of cooked foods.

The frozen-foods inlet 4 must be configured to only allow authorized users to add frozen foods to the components within the housing 1. To prevent tampering, the frozen-foods inlet 4 comprises an inlet opening 5, an inlet dispensing slide 6, and an inlet pneumatic actuator 7, as seen in FIG. 7. The inlet opening 5 is the hole through which frozen foods may enter the housing 1. The inlet dispensing slide 6 is the unit which toggles between a shut position, in which frozen food cannot enter the housing 1, and an open position, in which frozen food is directed appropriately within the housing 1. The inlet pneumatic actuator 7 is the mechanism which coordinates electronic signals and power to operate the inlet dispensing slide 6. The inlet opening 5 laterally traverses into the housing 1. Such an arrangement provides the user with an intuitive receiver for frozen foods. The inlet opening 5 is positioned adjacent to the at least one fryer basin 12. Thus, the inlet opening 5 is positioned for optimal and efficient transfer of food to the components adjacent to the at least one fryer basin 12. The inlet dispensing slide 6 is hingedly connected to the housing 1, adjacent to the inlet opening 5. In this way, the inlet dispensing slide 6 is positioned optimally to toggle access to the at least one fryer basin 12. The inlet pneumatic actuator 7 is operatively coupled in between the inlet dispensing slide 6 and the housing 1, wherein the inlet pneumatic actuator 7 is used to selectively open and close the inlet dispensing slide 6. Thus, the inlet pneumatic actuator 7 drives the motion to toggle the open or closed state of the inlet dispensing slide 6. The inlet pneumatic actuator 7 is electronically connected to the control unit 44. Such a connection enables the control unit 44 to regulate the position of the inlet dispensing slide 6, possibly in response to signals generated from processing of various timers or sensors within the housing 1.

Figure 8:
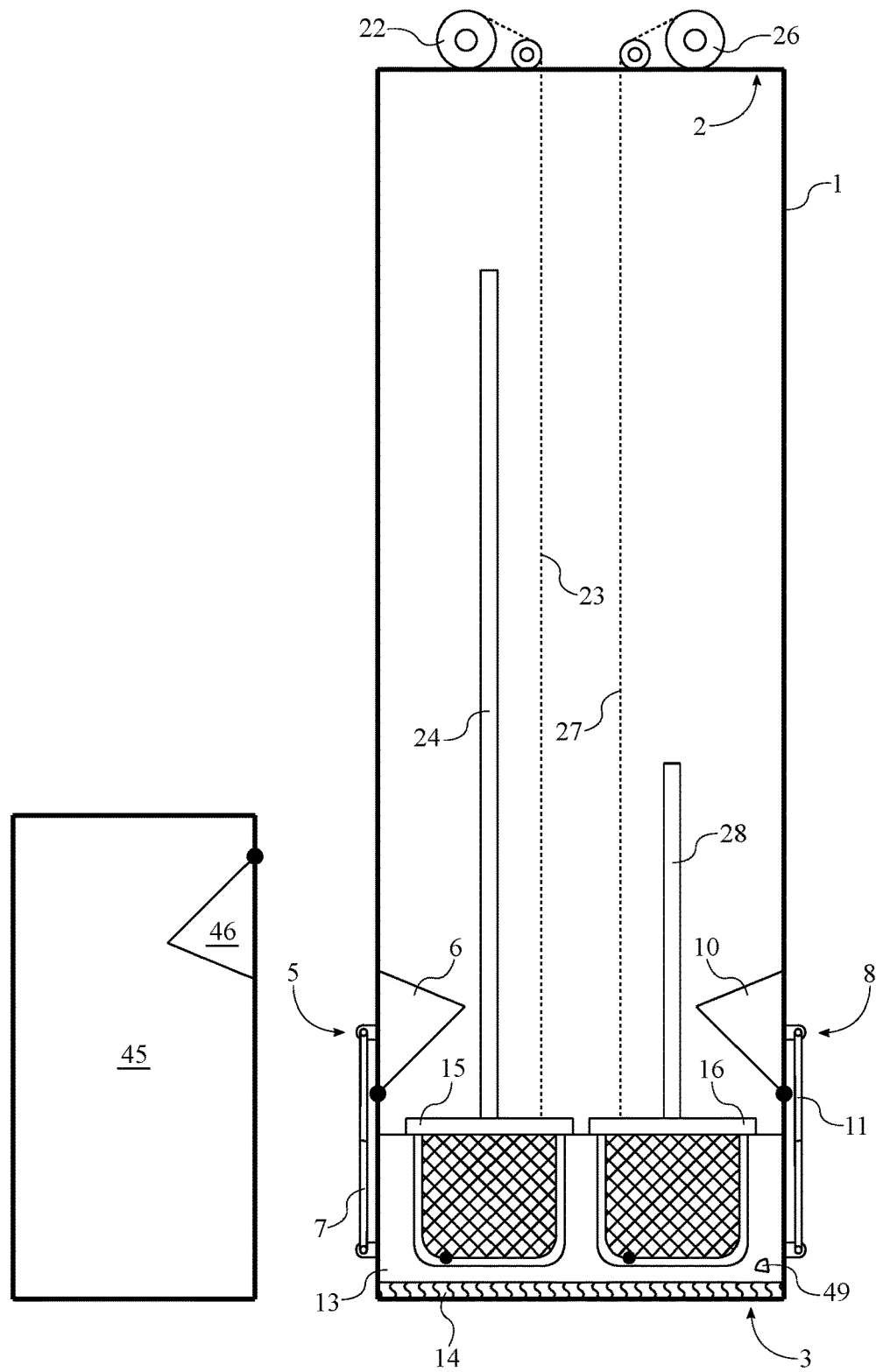
FIG. 8 is a schematic diagram of the present invention without storage baskets.

The fried-foods outlet 8 must be configured to provide fully cooked food to the user in a convenient and efficient manner. To enable this, the fried-foods outlet 8 comprises an outlet opening 9, an outlet dispensing slide 10, and an outlet pneumatic actuator 11, as seen in FIG. 8. The outlet opening 9 is the hole through which fully cooked foods may exit the housing 1. The outlet dispensing slide 10 is the unit which toggles between a shut position, in which fully cooked food cannot exit the housing 1, and an open position, in which fully cooked food is directed appropriately outside the housing 1. The outlet pneumatic actuator 11 is the mechanism which coordinates electronic signals and power to operate the outlet dispensing slide 10. The outlet opening 9 laterally traverses into the housing 1. Such an arrangement provides the user with an intuitive receiver for fully cooked foods. The outlet opening 9 is positioned adjacent to the at least one fryer basin 12. Thus, the outlet opening 9 is positioned for efficient transfer of fully cooked food to the user immediately upon frying completion. The outlet dispensing slide 10 is hingedly connected to the housing 1, adjacent to the outlet opening 9. In this way, the outlet dispensing slide 10 is optimally connected to toggle access to the inside of the housing 1. The outlet pneumatic actuator 11 is operatively coupled in between the outlet dispensing slide 10 and the housing 1, wherein the outlet pneumatic actuator 11 is used to selectively open and close the outlet dispensing slide 10. Thus, the outlet pneumatic actuator 11 drives the motion to toggle the open or closed state of the outlet dispensing slide 10. The outlet pneumatic actuator 11 is electronically connected to the control unit 44. Such a connection enables the control unit 44 to regulate the position of the outlet dispensing slide 10, possibly in response to signals generated from processing of various timers or sensors within the housing 1.

Figure 13:
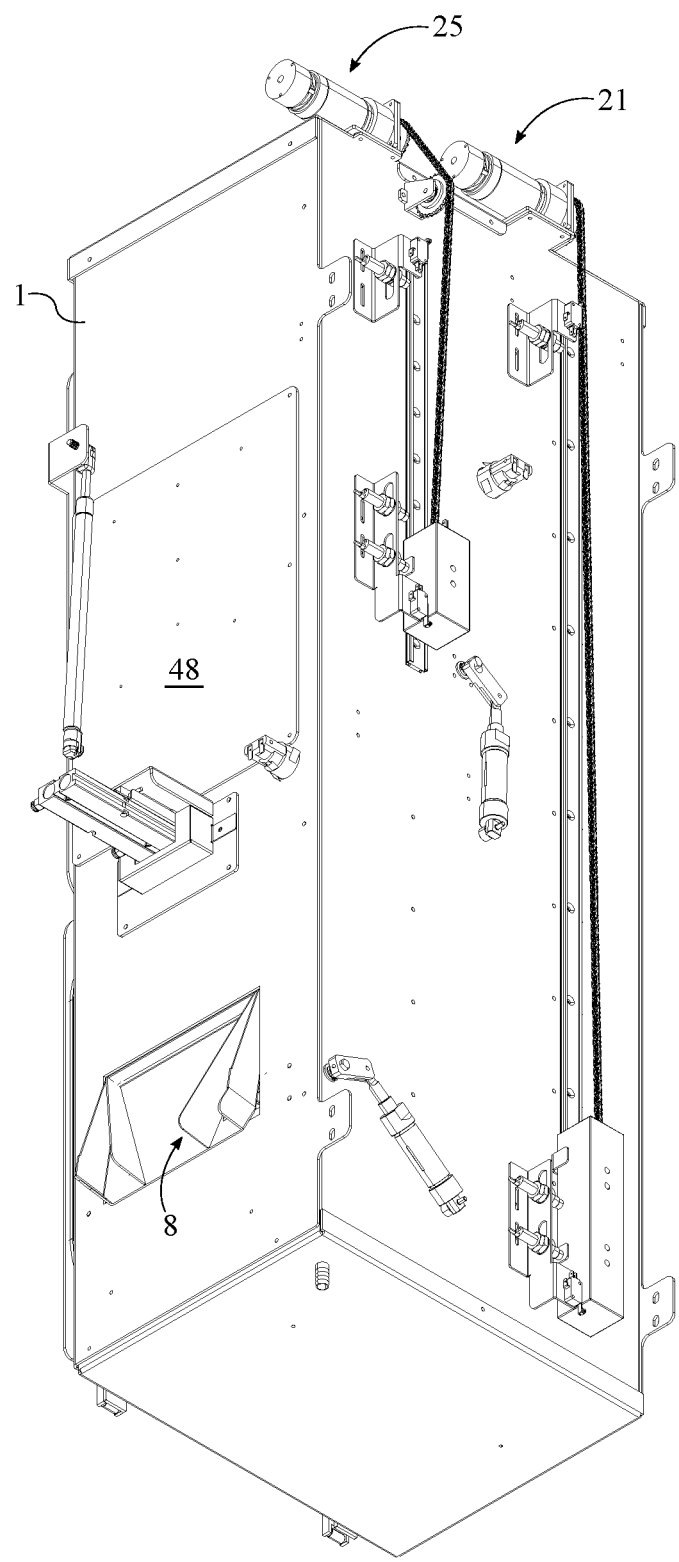
FIG. 13 is a bottom-rear perspective view of the present invention.
Figure 14:
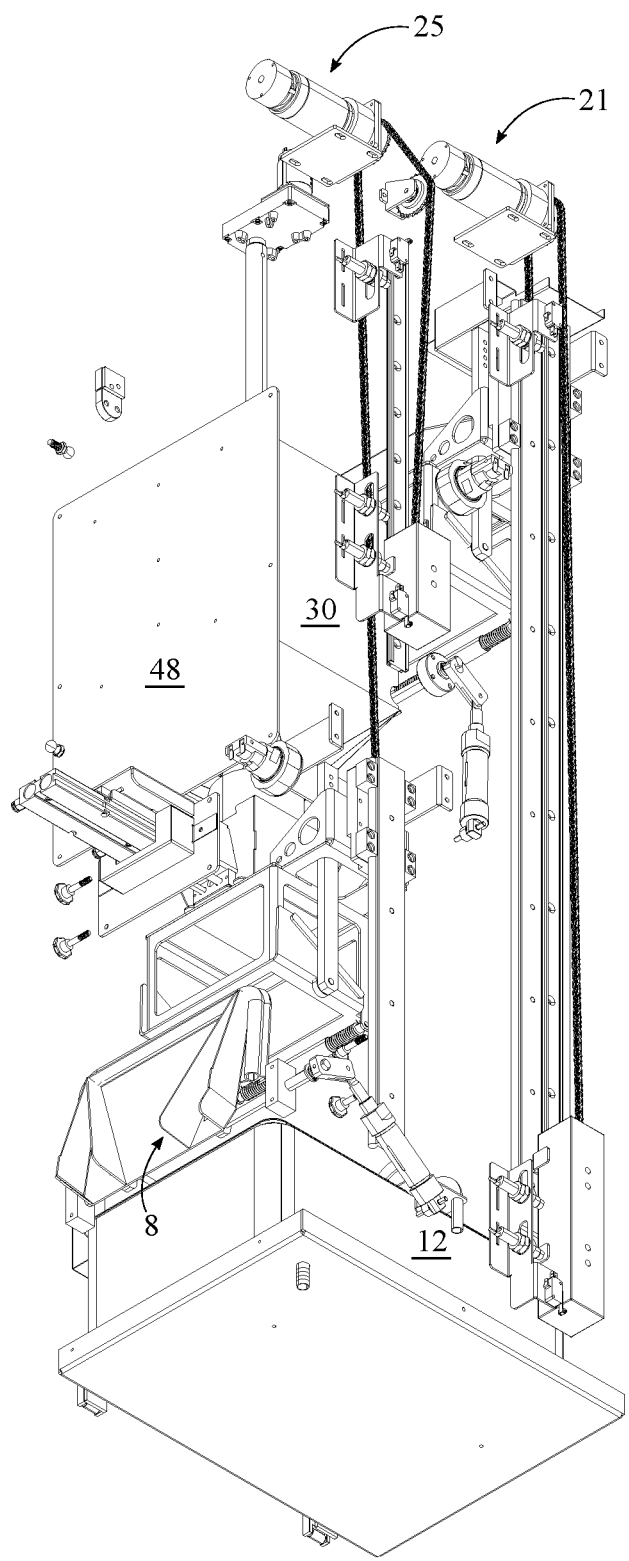
FIG. 14 is a bottom-rear perspective view of the present invention without the housing.

The first conveyer 21 requires a mechanism by which to rise and lower in a controlled manner through the housing 1. To provide this capacity, the first conveyor 21 comprises a first motor 22, a first chain-drive 23, and a first linear track 24, as seen in FIGS. 13 and 14. The first motor 22 is a mounted stator that is electrically powering a spinning rotor, thus providing a source of rotational mechanical energy. The first chain-drive 23 is an interconnected series of chain links, pulleys, gears, and other such components required to transfer power from the first motor 22 to the first linear track 24 and to mount relevant components. The first linear track 24 is a guide for the movement of the first frying basket 15, which prevents inefficiency in motion. The first linear track 24 is internally connected along the housing 1. This arrangement enables the first linear track 24 to restrict movement to a preferably vertical path traversing the height of the housing 1 from the at least one fryer basin 12 to the roof 2. The first chain-drive 23 is mounted along the first linear track 24. This connection provides the first chain-drive 23 with the guidance required to enable efficient movement of connected components. The first frying basket 15 is slidably connected along the first linear track 24. Thus, the first frying basket 15 is provided with the guidance to move vertically through the housing 1. The first frying basket 15 is terminally connected to the first chain-drive 23. In this way, the first chain-drive 23 is able to slidably move the first frying basket 15 along the first linear track 24. The first motor 22 is operatively coupled to the first chain-drive 23, wherein the first motor 22 is used to actuate the first chain-drive 23. This arrangement allows the first motor 22 to provide power to the first chain-drive 23, thus allowing movement of the first chain-drive 23. The first motor 22 is electronically connected to the control unit 44. Such a connection enables the control unit 44 to regulate motion of the first motor 22, and consequently the first frying basket 15, through the housing 1, possibly in response to signals generated from processing of various timers or sensors within the housing 1.

Similar to the first conveyer 21, the second conveyer 25 requires components that allow for vertical motion through the housing 1, particularly between the at least one fryer basin 12 and the fried-foods outlet 8. To provide this capacity, the second conveyer 25 comprises a second motor 26, a second chain-drive 27, and a second linear track 28, as seen in FIGS. 13 and 14. The second motor 26 is a mounted stator that is electrically powering a spinning rotor, thus providing a source of rotational mechanical energy. The second chain-drive 27 is an interconnected series of chain links, pulleys, gears, and other such components required to transfer power from the second motor 26 to the second linear track 28 and to mount relevant components. The second linear track 28 is a guide for the movement of the second frying basket 16, which prevents inefficiency in motion. The second linear track 28 is internally connected along the housing 1. This arrangement enables the second linear track 28 to restrict movement to a preferably vertical path traversing from the at least one fryer basin 12 to the fried-foods outlet 8. The second chain-drive 27 is mounted along the second linear track 28. This connection provides the second chain-drive 27 with the guidance required to enable efficient movement of connected components. The second frying basket 16 is slidably connected along the second linear track 28. Thus, the second frying basket 16 is provided with the guidance to move vertically through the housing 1. The second frying basket 16 is terminally connected to the second chain-drive 27. In this way, the second chain-drive 27 is able to slidably move the second frying basket 16 along the second linear track 28. The second motor 26 is operatively coupled to the second chain-drive 27, wherein the second motor 26 is used to actuate the second chain-drive 27. This arrangement allows the second motor 26 to provide power to the second chain-drive 27, thus allowing movement of the second chain-drive 27. The second motor 26 is electronically connected to the control unit 44. Such a connection enables the control unit 44 to regulate motion of the second motor 26, and consequently the second frying basket 16, through the housing 1, possibly in response to signals generated from processing of various timers or sensors within the housing 1.

Figure 10:
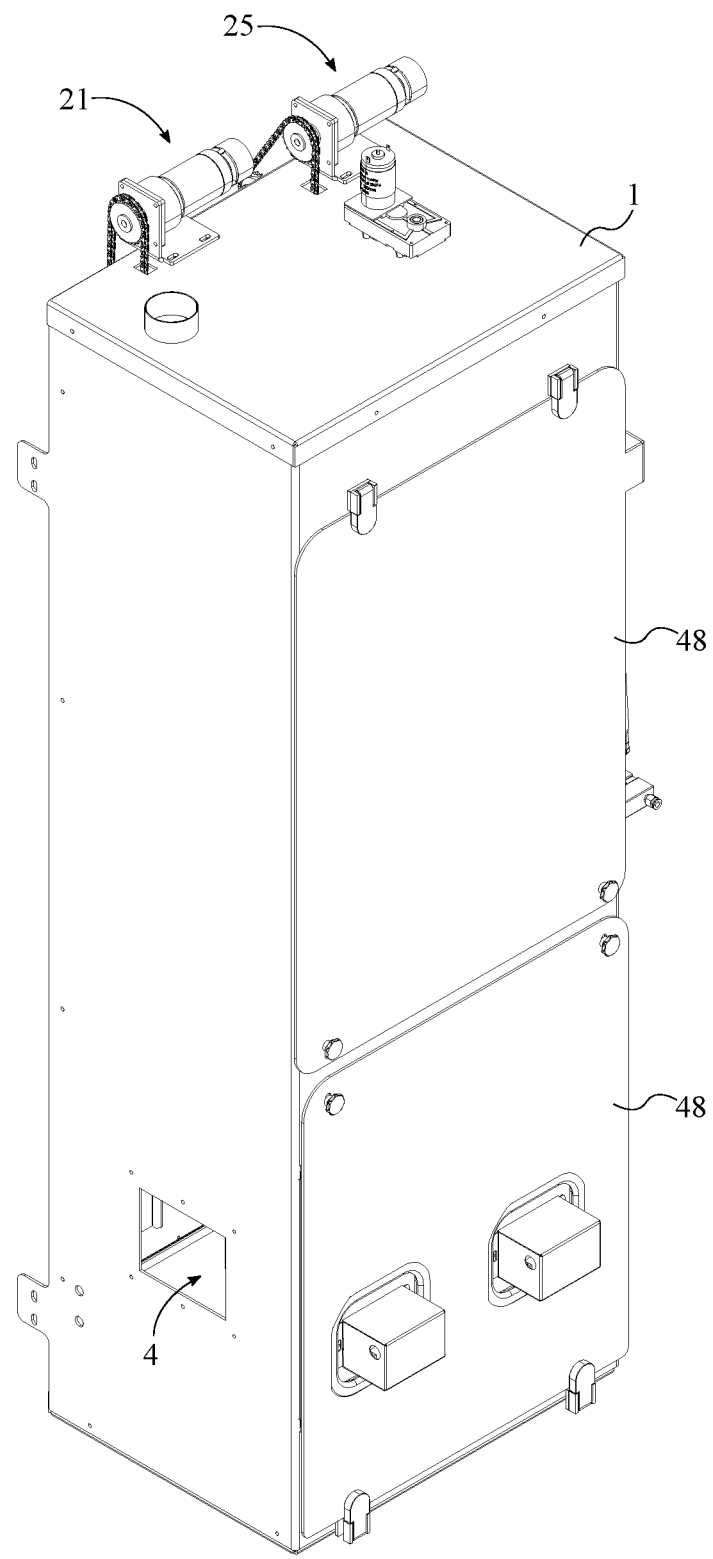
FIG. 10 is a top-front perspective view of the present invention.

The present invention includes components that move, heat, cook, and transfer electricity. As such, the present invention requires maintenance to ensure food safety and quality. To address this issue, the present invention further comprises at least one access port 47 and at least one maintenance panel 48, as seen in FIG. 10. The at least one access port 47 is a cut into the housing 1 that provides user access to various components of the present invention. The at least one maintenance panel 48 relates to a rigid door or surface that covers the at least one access port 47, preventing tampering and heat loss. The at least one access port 47 laterally traverses into the housing 1. This arrangement ensures that the at least one access port 47 provides necessary movement space for the user reaching into the housing 1. The at least one maintenance panel 48 is hingedly connected to the housing 1, adjacent to the at least one access port 47. Thus, the at least one maintenance panel 48 provides or restricts access to the inside of the housing 1. In an exemplary embodiment, the at least one maintenance panel 48 utilizes hydraulics in order to facilitate opening of the at least one maintenance panel 48 and in order to support the at least one maintenance panel 48 in an open position. Further, the at least one maintenance panel 48 may include any of a variety of locking mechanisms in order to prevent unauthorized access to the housing 1.

The present invention further benefits from the inclusion of sensors that monitor the progress of cooking. To this end, the present invention further comprises at least one temperature sensor 49, as seen in FIG. 8. The at least one temperature sensor 49 is an electronic device capable of converting the ambient temperature into an electronic signal. The at least one temperature sensor 49 is in thermal communication with the at least one fryer basin 12. This arrangement allows the at least one temperature sensor 49 to generate electronic responses in conjunction with the temperature of the at least one fryer basin 12 and consequently, the contents thereof. The at least one temperature sensor 49 is electronically connected to the control unit 44. This connection allows the at least one temperature sensor 49 to send signals to the control unit 44, which may respond with output signals according to that data, thus appropriately coordinating motion and location of components within the housing 1.

The present invention includes a preferred system for usage. An administrative user interacts with the control panel to begin the process. The heater 14 activates, raising the temperature of the cooking oil contained within the at least one fryer basin 12. Frozen food is entered into the frozen-foods inlet 4. This frozen food drops from the frozen-foods inlet 4 into the first frying basket 15. When the at least one temperature sensor 49 registers the appropriate cooking temperature, the first frying basket 15 is lowered into the at least one fryer basin 12. Upon pre-cooking completion, as preferably determined by calculation of the immersion time, the first frying basket 15 is raised out of the at least one fryer basin 12. The first frying basket 15 rises into position adjacent to the vending mechanism 29. The transfer chute 19 of the first frying basket 15 and the motorized receiving chute 31 of the retaining assembly 30 open concurrently, resulting in the transfer of the pre-cooked food to the retaining assembly 30. These steps are repeated until the retaining assembly 30 is filled. In order to retrieve cooked food from the present invention, a user next approaches a control panel and enters a fried food order, which is transferred to the control unit 44. The control unit 44 sends corresponding signals to the second motor 26 and the weight assembly 37. The weight assembly 37 deposits the appropriate amount of pre-cooked food into the second frying basket 16. The second frying basket 16 is then lowered into the at least one fryer basin 12 for a final cook and reheat. Once the food is fully cooked, as preferably determined by calculation of the immersion time, the second frying basket 16 lifts out of the at least one fryer basin 12. The second frying basket 16 rises into position adjacent to the fried-foods outlet 8. The transfer chute 19 of the second frying basket 16 and the outlet dispensing slide 10 of the fired-foods outlet 10 concurrently open, which results in the transfer of the fully cooked food to the user.

Although the invention has been explained in relation to its preferred embodiment, it is to be understood that many other possible modifications and variations can be made without departing from the spirit and scope of the invention as hereinafter claimed.

What is claimed is:

1. A food frying and distribution device comprises:
a housing;
a frozen-foods inlet;
a fried-foods outlet;
at least one fryer basin;
a first frying basket;
a second frying basket;
a first conveyer;
a second conveyer;
a vending mechanism;
a control unit;
the housing comprises a roof and a floor;
the roof and the floor being positioned opposite to each other about the housing;
the at least one fryer basin, the first frying basket, the second frying basket, the first conveyer, the second conveyer, and the vending mechanism being positioned within the housing;
the at least one fryer basin being mounted onto the floor;
the first conveyer traversing from the at least one fryer basin to the roof;

the first frying basket being operatively coupled to the first conveyer, wherein the first conveyer is used to move the first frying basket through the housing;
the vending mechanism being mounted in between the roof and the at least one fryer basin;
the second conveyer traversing from the vending mechanism to the at least one fryer basin;
the second frying basket being operatively coupled to the second conveyer, wherein the second conveyer is used to move the second frying basket through the housing;
the frozen-food inlet being integrated into the housing, adjacent to the first conveyer;
the fried-foods outlet being integrated into the housing, adjacent to the second conveyer; and
the at least one fryer basin, the first conveyer, the second conveyer, and the vending mechanism being electronically connected to the control unit.

2. The food frying and distribution device as claimed in claim 1 comprises:
the at least one fryer basin comprises a basin body and a heater;
the heater being in thermal communication with the basin body; and
the heater being electronically connected to the control unit.

3. The food frying and distribution device as claimed in claim 1 comprises:
the at least one fryer basin being a first fryer basin and a second fryer basin;
the first fryer basin and the second fryer basin being positioned adjacent to each other;
the first fryer basin being positioned adjacent to the first conveyer; and
the second fryer basin being positioned adjacent to the second conveyer.

4. The food frying and distribution device as claimed in claim 1 comprises:
a freezer;
the freezer being externally positioned to the housing; and
the freezer being mounted adjacent to the frozen-foods inlet.

5. The food frying and distribution device as claimed in claim 4 comprises:
the freezer comprises a motorized hatch door;
the motorized hatch door being positioned adjacent to the frozen-foods inlet; and
the motorized hatch door being electronically connected to the control unit.

6. The food frying and distribution device as claimed in claim 1 comprises:
the vending mechanism comprises a retaining assembly and a weight assembly; and
the weight assembly being positioned in between the retaining assembly and the second conveyer.

7. The food frying and distribution device as claimed in claim 6 comprises:
the retaining assembly comprises a motorized receiving chute, a first trapdoor mechanism, and a first receptacle;
the first receptacle comprises a first receptacle inlet, a first receptacle body, and a first receptacle base;
the first receptacle inlet being oriented towards the roof;
the first receptacle base being oriented towards the weight assembly;
the motorized receiving chute being hingedly connected to the first receptacle body, adjacent to the first receptacle inlet;
the first trapdoor mechanism being operatively integrated into the first receptacle base, wherein the first trapdoor mechanism is used to selectively create an opening in the first receptacle base; and
the motorized receiving chute and the first trapdoor mechanism being electronically connected to the control unit.

8. The food frying and distribution device as claimed in claim 7 comprises:
the first receptacle body tapering from the first receptacle inlet to the first receptacle base.

9. The food frying and distribution device as claimed in claim 6 comprises:
the weight assembly comprises a weight sensor, a second trapdoor mechanism, and a second receptacle;
the second receptacle comprises a second receptacle inlet, a second receptacle body, and a second receptacle base;
the second receptacle inlet being oriented towards the retaining assembly;
the second receptacle base being oriented towards the floor;
the weight sensor being operatively integrated into the second receptacle base, wherein the weight sensor is used to take a weight measurement of contents within the second receptacle;
the second trapdoor mechanism being operatively integrated into the second receptacle base, wherein the second trapdoor mechanism is used to selectively create an opening in the second receptacle base; and
the weight sensor and the second trapdoor mechanism being electronically connected to the control unit.

10. The food frying and distribution device as claimed in claim 9 comprises:
the second receptacle body tapering from the second receptacle inlet to the second receptacle base.

11. The food frying and distribution device as claimed in claim 1 comprises:
the first frying basket and the second frying basket each comprise a lateral basket wall, a basket base, a transfer chute, and a spring-loaded release mechanism;
the lateral basket wall being perimetrically connected to the basket base;
the basket base being oriented towards the floor; and
the transfer chute being operatively integrated into the basket base by the spring-loaded release mechanism, wherein the spring-loaded release mechanism is used to release contents within the first frying basket or the second frying basket by selectively opening the transfer chute.

12. The food frying and distribution device as claimed in claim 1 comprises:
the frozen-foods inlet comprises an inlet opening, an inlet dispensing slide, and an inlet pneumatic actuator;
the inlet opening laterally traversing into the housing;
the inlet opening being positioned adjacent to the at least one fryer basin;
the inlet dispensing slide being hingedly connected to the housing, adjacent to the inlet opening;
the inlet pneumatic actuator being operatively coupled in between the inlet dispensing slide and the housing, wherein the inlet pneumatic actuator is used to selectively open and close the inlet dispensing slide; and
the inlet pneumatic actuator being electronically connected to the control unit.

13. The food frying and distribution device as claimed in claim 1 comprises:

the fried-foods outlet comprises an outlet opening, an outlet dispensing slide, and an outlet pneumatic actuator;

the outlet opening laterally traversing into the housing;

the outlet opening being positioned adjacent to the at least one fryer basin;

the outlet dispensing slide being hingedly connected to the housing, adjacent to the outlet opening;

the outlet pneumatic actuator being operatively coupled in between the outlet dispensing slide and the housing, wherein the outlet pneumatic actuator is used to selectively open and close the outlet dispensing slide; and the outlet pneumatic actuator being electronically connected to the control unit.

14. The food frying and distribution device as claimed in claim 1 comprises:

the first conveyor comprises a first motor, a first chain-drive, and a first linear track;

the first linear track being internally connected along the housing;

the first chain drive being mounted along the first linear track;

the first frying basket being slidably connected along the first linear track;

the first frying basket being terminally connected to the first chain drive;

the first motor being operatively coupled to the first chain drive, wherein the first motor is used to actuate the first chain drive; and the first motor being electronically connected to the control unit.

15. The food frying and distribution device as claimed in claim 1 comprises:

the second conveyor comprises a second motor, a second chain-drive, and a second linear track;

the second linear track being internally connected along the housing;

the second chain drive being mounted along the second linear track;

the second frying basket being slidably connected along the second linear track;

the second frying basket being terminally connected to the second chain drive;

the second motor being operatively coupled to the second chain drive, wherein the second motor is used to actuate the second chain drive; and the second motor being electronically connected to the control unit.

16. The food frying and distribution device as claimed in claim 1 comprises:

at least one access port;

at least one maintenance panel;

the at least one access port laterally traversing into the housing; and the at least one maintenance panel being hingedly connected to the housing, adjacent to the at least one access port.

17. The food frying and distribution device as claimed in claim 1 comprises:

at least one temperature sensor;

the at least one temperature sensor being in thermal communication with the at least one fryer basin; and the at least one temperature sensor being electronically connected to the control unit.

* * * * *